United States Patent [19]
Heger et al.

[11] Patent Number: 5,252,672
[45] Date of Patent: Oct. 12, 1993

[54] POLYMER BLENDS OF POLYAMIDES AND POLYMERS CONTAINING SULFONAMIDE STRUCTURAL UNITS

[75] Inventors: Georg Heger, Krefeld; Holger Lütjens, Cologne; Gerd Fengler, Krefeld-Traar; Christian Lindner, Cologne, all of Fed. Rep. of Germany

[73] Assignee: Bayer Aktiengesellschaft, Leverkusen, Fed. Rep. of Germany

[21] Appl. No.: 801,044

[22] Filed: Dec. 3, 1991

[30] Foreign Application Priority Data

Dec. 14, 1990 [DE] Fed. Rep. of Germany ........ 4040025

[51] Int. Cl.$^5$ .............................................. C08L 77/00
[52] U.S. Cl. ..................................... 525/178; 525/183
[58] Field of Search ................................ 525/183, 178

[56] References Cited

U.S. PATENT DOCUMENTS

| | | | |
|---|---|---|---|
| 3,170,004 | 2/1965 | Farago et al. | 525/183 |
| 3,496,151 | 2/1970 | Korbanka et al. | 525/178 |
| 3,665,054 | 5/1972 | Burrows et al. | 525/178 |
| 4,265,970 | 5/1981 | Bach | 428/364 |

Primary Examiner—Ana L. Carrillo
Attorney, Agent, or Firm—Connolly & Hutz

[57] ABSTRACT

The invention relates to improved polymer blends of polyamides and vinyl polymers containing sulfonamide structural units. Polyamide molding compounds having reduced water absorption and improved dimensional stability coupled with good mechanical properties, such as impact strength and rigidity, minimal discoloration, high heat resistance and migration resistance, are thus obtained.

4 Claims, No Drawings

POLYMER BLENDS OF POLYAMIDES AND POLYMERS CONTAINING SULFONAMIDE STRUCTURAL UNITS

This invention relates to improved polymer blends of polyamides and vinyl polymers containing sulfonamide structural units. Polyamide molding compounds having reduced water absorption and improved dimensional stability coupled with good mechanical properties, such as impact strength and rigidity, minimal discoloration, high heat resistance and migration resistance, are thus obtained.

By virtue of their favorable mechanical and physical properties, polyamides have an established position in industry as important structural materials. A feature of polyamides is their comparatively high water absorption.

This water absorption is attributable to the carboxylic acid amide groups. On account of their high polarity, they show a particular affinity for water. The absorption of water (which occurs not only when polyamide moldings are stored in water, but also when they are exposed to humid air) is directly related to the number of carboxylic acid amide groups in the polymer molecule. The industrial thermoplastics, such as polyamide-6, polyamide-46 and polyamide-66, are particularly affected.

The water which penetrates into the amorphous regions of the polyamide loosens the hydrogen bridges in the polymer by itself forming hydrogen bridges between the carboxylic acid amide groups. All mechanical and physical properties (plasticization of the material) are affected.

Important performance properties, such as for example toughness, elongation at break, dielectric strength and modulus of elasticity, depend to a large extent on the water absorption. Certain polyamide properties are improved while others are adversely affected by the absorption of water. Thus, although impact strength is increased, rigidity and dielectric strength are reduced compared with freshly molded parts.

Another consequence of water absorption is inadequate dimensional stability of the moldings. Only those dimensional changes which are produced by brief contact with water can be reversed by drying, prolonged exposure to moisture resulting in irreparable dimensional changes of the moldings.

Although the poor dimensional stability of moldings can be distinctly improved by conditioning with water, their mechanical properties are adversely affected in the process, as described above.

However, maintaining or improving the rigidity and dimensional stability of polyamide moldings is an important requirement where they are intended to perform a load-bearing or strength-supporting function, as is the case for example in vehicle and machine construction and in the manufacture of plant and appliances.

One known method of reducing the water absorption of polyamides is to add known low molecular weight polyamide plasticizers, for example special phenols (see DE 3 248 329) or special aromatic amines (see EP 166 321). Disadvantages of these additives are their lack of migration resistance, their inadequate processing stability and their high volatility which can lead to odor emissions during incorporation.

It has now been found that the addition of vinyl polymers containing sulfonamide structural units to polyamides leads to a reduction in water absorption coupled with good mechanical properties, such as toughness and rigidity and high dimensional stability. At the same time, the new molding compounds are distinguished by resistance to migration, a low content of volatile components, minimal discoloration, resistance to washing out by solvents, high ageing resistance and high heat resistance.

Accordingly, the present invention relates to polymer blends containing

A) a polyamide A) and

B) a homopolymer or copolymer B) of a radical-polymerizable sulfonamide monomer and, optionally, other sulfonamide-free vinyl monomers.

The present invention also relates to the use of the polymer blends of components A) and B) for the production of thermoplastic molding compounds.

The polyamide component A) of the polymer blends according to the invention may be selected from any partly crystalline polyamides, more particularly polyamide-6, polyamide-6,6, polyamide-4,6, and from mixtures and partly crystalline copolyamides based on these components. Other suitable partly crystalline polyamides are those of which the acid component consists in particular completely or partly (in addition to adipic acid or ε-caprolactam), of terephthalic acid and/or isophthalic acid and/or suberic acid and/or sebacic acid and/or azelaic acid and/or dodecane dicarboxylic acid and/or adipic acid and/or a cyclohexane dicarboxylic acid and of which the diamine components consist completely or partly of, in particular, m- and/or p-xylylenediamine and/or tetramethylenediamine and/or hexamethylenediamine and/or 2,2,4- and/or 2,4,4-trimethyl hexamethylenediamine and/or isophoronediamine and of which the compositions are known from the prior art.

Other suitable partly crystalline polyamides are those produced completely or partly from $C_{6\text{-}12}$ lactams, optionally using one or more of the starting components mentioned above.

Particularly preferred partly crystalline polyamides A) are polyamide-6 and polyamide-6,6, mixtures thereof or copolyamides thereof with only small percentage contents (up to about 10% by weight) of the co-components. Amorphous polyamides may also be used as the polyamide component A). They are obtained by polycondensation of diamines, for example ethylenediamine, tetramethylene-diamine, hexamethylenediamine, decamethylenediamine, 2,2,4-and/or 2,4,4-trimethyl hexamethylenediamine, m- and/or p-xylylenediamine, bis-(4-aminocyclohexyl)-methane or mixtures of 4,4'- or 2,2'-diaminodicyclohexyl methanes, 2,2-bis-(4-aminocyclohexyl)-propane, 3,3'-dimethyl-4,4'-diaminodicyclohexyl methane, 3-aminoethyl-3,5,5-trimethyl cyclohexyl amine, 2,5- and/or 2,6-bis-(aminomethyl)-norbornane and/or 1,4-diaminomethyl cyclohexane, with dicarboxylic acids, for example oxalic acid, adipic acid, azelaic acid, decane dicarboxylic acid, heptadecane dicarboxylic acid, 2,2,4- and/or 2,4,4-trimethyl adipic acid, isophthalic acid or small quantities of terephthalic acid. Amorphos copolymers obtained by polycondensation of several monomers are also suitable, as are copolymers which have been produced with addition of aminocarboxylic acids, such as ω-aminocaproic acid, ω-aminoundecanoic acid or ω-aminolauric acid or lactams thereof.

Particularly suitable amorphous polyamides are the polyamides produced from isophthalic acid, hexamethylenediamine and other diamines, such as 4,4'-diaminodicyclohexyl methane, isophoronediamine, 2,2,4- and/or 2,2,4-trimethyl hexamethylenediamine, 2,5- and/or 2,6-bis-(aminomethyl)-norbornane; or from isophthalic acid, 4,4'-diaminodicyclohexyl methane and ε-caprolactam; or from isophthalic acid, 3,3'-dimethyl-4,4'-diaminodicyclohexyl methane and lauric lactam; or from terephthalic acid and the isomer mixture of 2,2,4- and/or 2,4,4-trimethyl hexamethylenediamine.

Instead of using pure 4,4'-diaminodicyclohexyl methane, it is also possible to use mixtures of the position-isomeric diaminodicyclohexyl methanes which consist of
70 to 99 mol-% of the 4,4'-diamino isomer
0 to 30 mol-% of the 2,4'-diamino isomer
0 to 2 mol-% of the 2,2'-diamino isomer
and, optionally, correspondingly more highly condensed diamines obtained by hydrogenation of technical diaminophenyl methane.

Homopolymers or copolymers of a radical-polymerizable sulfonamide monomer and, optionally, other sulfonamide-free vinyl monomers are suitable as component B) of the polymer blends according to the invention. Sulfonamide monomers are vinyl monomers containing structural units corresponding to formula (I)

$$-SO_2-\underset{H}{N}- \quad (I)$$

Preferred sulfonamide monomers are the vinyl monomers corresponding to formulae (II) and (III):

(II)

in which
R$^1$ = H, methyl
X = single bond, C$_{1-8}$ alkylene, difunctional aromatic C$_{6-25}$ hydrocarbon radical,

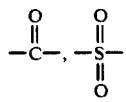

R$^2$ = C$_{1-12}$ alkyl, monofunctional aromatic C$_{6-25}$ hydrocarbon radical

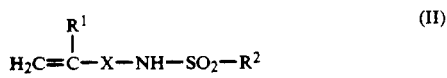
(III)

with
R$^1$ = H, methyl
Y = single bond, C$_{1-8}$ alkylene, difunctional aromatic C$_{6-25}$ hydrocarbon radical,

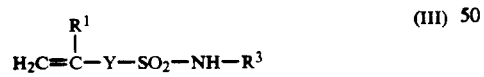

where Z = difunctional aromatic C$_{6-25}$ hydrocarbon radical, 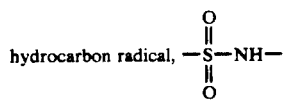

R$^3$ = hydrogen, C$_{1-12}$ alkyl, monohydric aromatic C$_{6-25}$ hydrocarbon radical,

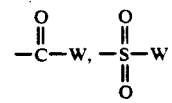

where W = C$_{1-12}$ alkyl or a monofunctional aromatic C$_{6-25}$ hydrocarbon radical.

Particularly preferred vinyl monomers corresponding to formulae (II) and (III) are those in which
R$^1$ = H, CH$_3$
X = single bond, C$_{1-4}$ alkylene, difunctional aromatic C$_{6-15}$ and, more particularly, C$_{6-9}$ hydrocarbon radical,

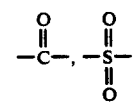

R$^2$ = C$_{1-8}$ alkyl, more preferably C$_{1-4}$ alkyl, monofunctional aromatic C$_{6-15}$ and, more particularly, C$_{6-9}$ hydrocarbon radical, Y = single bond, C$_{1-4}$ alkylene, difunctional aromatic C$_{6-15}$ and, more particularly, C$_{6-9}$ hydrocarbon radical,

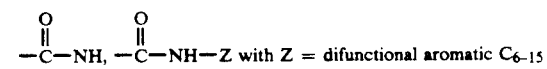

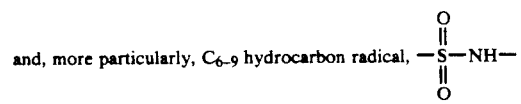

R$^3$ = hydrogen, C$_{1-8}$ alkyl, more particularly C$_{1-4}$ alkyl, monofunctional C$_{6-15}$ and, more particularly, C$_{6-9}$ hydrocarbon radical,

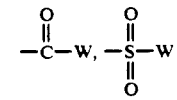

where W = C$_{1-8}$ alkyl, more particularly C$_{1-4}$ alkyl or a monofunctional aromatic C$_{6-15}$ and, more particularly, C$_{6-9}$ hydrocarbon radical.

The following are examples of suitable sulfonamide monomers corresponding to formulae (II) and (III):

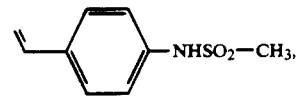

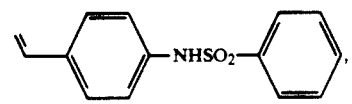

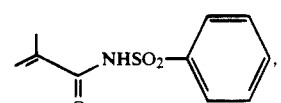

-continued

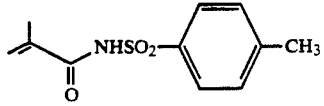

CH₂=CHSO₂NH₂, CH₂=CHSO₂—NHC₂H₅,
CH₂=CHSO₂—NH(i-C₃H₇), CH₂=CHSO₂NH(n-C₄H₉),
CH₂=CHSO₂—NH(n-C₆H₁₃),

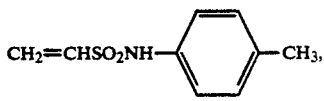

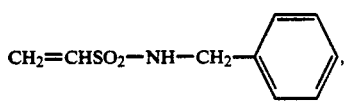

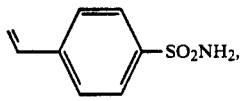

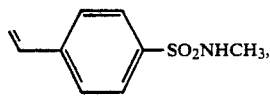

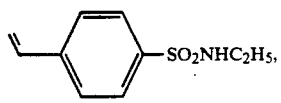

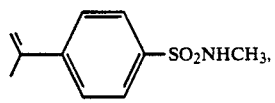

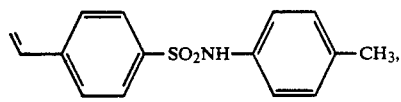

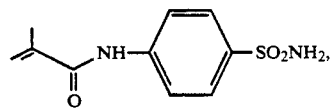

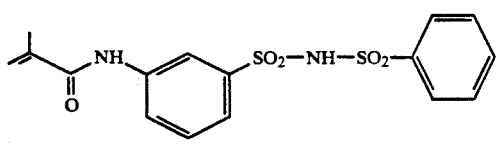

In the context of the invention, sulfonamide-free vinyl monomers are:
a) vinyl compounds, such as styrene, α-methyl styrene, halostyrenes, methoxystyrenes,
b) vinyl halides, such as vinyl chloride, vinyl fluoride, vinylidene chloride,
c) vinyl alkyl ketones, such as vinyl methyl ketone,
d) vinyl esters of organic acids, such as for example vinyl acetate, vinyl butyrate, vinyl propionate,
e) α,β-unsaturated carboxylic acids, such as acrylic acid, methacrylic acid, itaconic acid, maleic acid,
f) derivatives of acrylic acid and methacrylic acid, such as acrylonitrile, methacrylonitrile, acrylic acid amide, methacrylic acid amide, N-methylol acrylamide, N-methylol methacrylamide, dimethylaminopropyl amide,
g) C₁₋₄ alkyl acrylates, such as methyl, ethyl, n-, iso- or tert.-butyl, octyl, 2-ethylhexyl acrylate, chloroethyl acrylate, benzyl acrylate, phenyl ethyl acrylate;
h) polymerizable olefins and dienes, such as isobutylene, butadiene, isoprene, propylene, chloroprene or, for example,
i) vinyl alkyl ethers.

The homopolymers or copolymers B) preferably contain structural units corresponding to formula (IV) and/or (V)

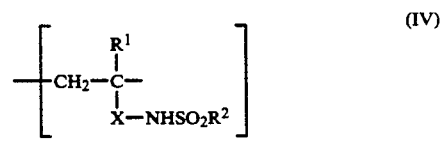

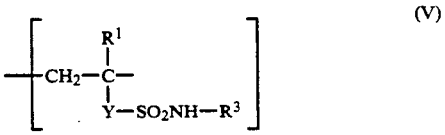

in which $R^1$, X, $R^2$, Y and $R^3$ are as defined for formulae (II) and (III) in quantities of 1 to 100% by weight and preferably in quantities of 5 to 100% by weight.

The homopolymers or copolymers B) may be prepared in known manner by polymerization from a radical-polymerizable sulfonamide monomer containing structural units corresponding to formula (I), preferably sulfonamide monomers corresponding to formulae (II) and (III), and optionally the sulfonamide-free vinyl monomers mentioned above.

The polymerization is preferably carried out as solution, suspension or emulsion polymerization and preferably in the presence of radical initiators. Suitable radical initiators are, for example, compounds containing azo groups, such as azoisobutyrodinitrile, 4,4-azo-bis-(4-cyanovaleric acid), organic peroxides, such as benzoyl peroxide, tert. butyl hydroperoxide, dibenzoyl peroxide, and inorganic peroxide salts, such as potassium peroxodisulfate, ammonium peroxodisulfate.

Where polymerization is carried out in solution, the solvents used may be solvents in which only the monomers are soluble or solvents in which both the monomers and the polymers are soluble. Suitable organic solvents are, for example, butanol, methyl ethyl ketone, ethyl benzene.

Where polymerization is carried out in (aqueous) emulsion, the monomers are best emulsified with emulsifiers, for example anionic, cationic or nonionic emulsifiers, for example sodium, potassium, ammonium salts of fatty acids, sodium lauryl sulfate, the sodium salt of $C_{14-18}$ alkyl sulfonic acids oleyl or octadecyl alcohol.

Polymerization is advantageously carried out at elevated temperature, for example at +30° to +90° C. and, more particularly, at +60° to +85° C. The molecular weight of the homopolymers or copolymers B) may be adjusted in known manner through the polymerization temperature, the monomer concentration, the quantity of catalyst and the molecular weight regulator. Preferred molecular weight regulators are organosulfur compounds, for example mercaptans or disulfides, more particularly long-chain mercaptans, such as n- and tert.-dodecyl mercaptans. They are normally dissolved in the monomer. The molecular weights $\overline{M}_w$ (weight average) of the polymers according to the invention (as determined by light scattering or sedimentation) are in the range from 1,000 to 5,000,000 g/mol.

The polymer blends according to he invention consist of 70 to 99% by weight component A) and 30 to 1% by weight component B).

In a preferred embodiment, they consist of 85 to 97.5% by weight component A) and 15 to 2.5% by weight component B).

Typical additives, including for example lubricants and mold release agents, nucleating agents, plasticizers, stabilizers, flameproofing additives, fillers and reinforcing materials, dyes and heat stabilizers, antioxidants and/or light stabilizers, may also be incorporated in the mixtures according to the invention.

The molding compounds according to the invention may be produced by mixing the components in standard mixing units, such as rolls, kneaders, single-screw or multiple-screw extruders.

The polymer blends according to the invention are suitable for the production of moldings of all kinds by any of the methods normally used for thermoplastics, such as extrusion and injection molding.

EXAMPLES

1) Components used:

A) Polyamide-6, relative viscosity 3.0 (as measured on a 1% by weight solution in m-cresol at 25° C.)

B) Sulfonamide polymers:

B1) Homopolymer prepared by solution polymerization of the monomer corresponding to formula (IIa) in methyl ethyl ketone

(IIa)

[η] DMF=0.45 dl/g

[η] intrinsic viscosity, as measured in dimethyl formamide at 25° C.

B2) Copolymer prepared by solution polymerization of a monomer mixture of methyl methacrylate and the monomer corresponding to formula (IIa) in a ratio by weight of 85:15 in methyl ethyl ketone

[η] DMF=0.42 dl/g

B3) Homopolymer prepared by solution polymerization of the monomer corresponding to formula (IIIa) in dimethyl acetamide

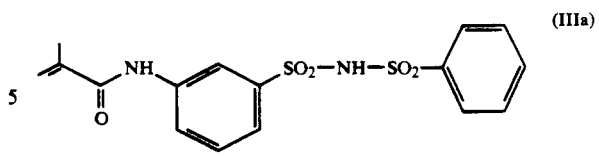

(IIIa)

[η] DMF=0.38 dl/g

B4) Copolymer prepared by solution polymerization of a monomer mixture of methyl methacrylate and the monomer corresponding to formula (IIIa) in a ratio by weight of 85:15 in methyl ethyl ketone

[η] DMF=0.36 dl/g

B5) Copolymer prepared by solution polymerization of a monomer mixture of methyl methacrylate and the monomer corresponding to formula (IIIa) in a ratio by weight of 70:30 in methyl ethyl ketone [η] DMF=0.40 dl/g.

2) Production and testing of the molding compounds

Polyamide A) was melted in a continuous-action twin-screw extruder, component B) was added to the melt and the melt was homogenized. The cylinder temperatures were selected so that melt temperatures of 270° to 320° C. were maintained. The melt strand is degassed before leaving the nozzle, introduced into water, granulated and dried.

Test specimens measuring 80 mm×10 mm×4 mm were made from the molding compounds in a standard injection molding machine. The test specimens were used to determine modulus of elasticity in bending both in the freshly molded state and after conditioning (DIN 53 457), Izod notched impact strength both in the freshly molded state and after conditioning (IS) 180) and the VICAT softening temperature VST/B (DIN 53 460). Water absorption was gravimetrically determined after storage for 21 days in water at 40° C. and after storage at 70° C./62% relative air humidity (ISO 1110).

The composition of the molding compounds is shown in Table 1, the test results are shown in Table 2.

The molding compounds according to the invention are distinguished by reduced water absorption and high dimensional stability, migration resistance of component B) and a light natural color.

TABLE 1

| Example No. | Composition of the molding compounds (% by weight) | | | | | |
|---|---|---|---|---|---|---|
| | A | B1 | B2 | B3 | B4 | B5 |
| 1 (Comparison) | 100 | — | — | — | — | — |
| 2* | 95 | — | — | — | — | — |
| 3 | 95 | 5 | — | — | — | — |
| 4 | 95 | — | 5 | — | — | — |
| 5 | 95 | — | — | 5 | — | — |
| 6 | 95 | — | — | — | 5 | — |
| 7 | 90 | — | — | 10 | — | — |
| 8 | 90 | — | — | — | — | 10 |

*Comparison test with 5% by weight bisphenol A

TABLE 2

| Example No. | Test results of the molding compounds | | | | | | | |
|---|---|---|---|---|---|---|---|---|
| | E modulus in bending [MPa] | $a_k^\#$ (fresh) [kJ/m²] | Vicat B [°C.] | Max. water absorption on storage in water [%] | Color | E modulus in bending+ [MPa] | $a_k^\#$ (cond.)+ (kJ/m²) | Water content+ % |
| 1* | 2623 | 7.5 | 200 | 9.34 | White | 780 | 25 | 3.15 |
| 2* | 2755 | 6.0 | 181 | 7.42 | Red-brown | 873 | 20 | 2.46 |
| 3 | 3071 | 5.3 | 185 | 8.50 | Whitish | 862 | 32.3 | 2.48 |
| 4 | 3131 | 6.2 | 190 | 9.21 | Whitish | 1039 | 25.5 | 2.81 |
| 5 | 2891 | 6.2 | 193 | 8.81 | Whitish | 934 | 30.9 | 2.72 |
| 6 | 2874 | 8.0 | 192 | 8.00 | Whitish | 909 | 40.8 | 2.69 |

TABLE 2-continued

| | Test results of the molding compounds | | | | | | | |
|---|---|---|---|---|---|---|---|---|
| Example No. | E modulus in bending [MPa] | $a_k^\#$ (fresh) [kJ/m²] | Vicat B [°C.] | Max. water absorption on storage in water [%] | Color | E modulus in bending+ [MPa] | $a_k^\#$ (cond.)+ (kJ/m²) | Water content+ % |
| 7 | 2896 | 6.8 | 197 | 7.78 | Whitish | 915 | 39.3 | 2.45 |
| 8 | 3189 | 6.0 | 195 | 8.46 | Whitish | 908 | 38.7 | 2.52 |

*Comparison tests
notched impact strength
+after conditioning in accordance with ISO 1110

The test specimens of Examples 3 to 6 are resistant to washing out when treated with warm water at 40° C. and show a reduction in water absorption and higher toughness values and moduli of elasticity in bending after conditioning by comparison with Example 1.

We claim:

1. A polymer blend comprising:
   A) 70–99% by weight of a thermoplastic polyamide; and
   B) 30–1% by weight of a polymer or copolymer prepared by radical polymerization of vinyl monomers containing sulfonamide units, the sulfonamide units having the formula —SO₂—NH—.

2. The polymer blend of claim 1 comprising 85 to 97.5% by weight of component A) and 15 to 2% by weight of component B).

3. The polymer blend of claim 1, wherein component B) is a copolymer prepared by reacting vinyl monomers containing sulfonamide units with additional vinyl monomers free of sulfonamide groups.

4. A polymer blend as claimed in claim 1, wherein the vinyl monomers containing sulfonamide units correspond to formulae (II):

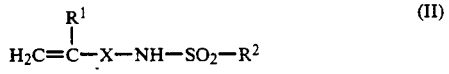

(II)

in which
R¹ = H or methyl
X = single bond, C₁₋₈ alkylene, difunctional aromatic C₆₋₂₅ hydrocarbon radical,

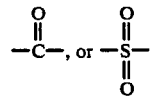

R² = C₁₋₁₂ alkyl or a monofunctional aromatic C₆₋₂₅ hydrocarbon radical; or correspond to formula (III):

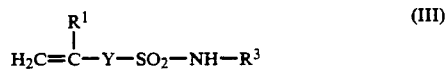

(III)

in which
R¹ = H or methyl
Y = single bond, C₁₋₈ alkylene, difunctional aromatic C₆₋₂₅ hydrocarbon radical,

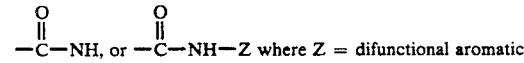

R³ = hydrogen, C₁₋₁₂ alkyl, monohydric aromatic C₆₋₂₅ hydrocarbon radical,

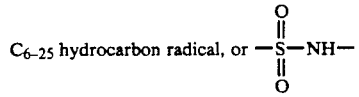

where W = C₁₋₁₂ alkyl or a monofunctional aromatic C₆₋₂₅ hydrocarbon radical.

* * * * *